(12) United States Patent
Kardos

(10) Patent No.: US 8,020,536 B2
(45) Date of Patent: Sep. 20, 2011

(54) COOLER ARRANGEMENT FOR A MOTOR VEHICLE

(75) Inventor: Zoltan Kardos, Södertälje (SE)

(73) Assignee: Scania CV AB (Publ) (SE)

( * ) Notice: Subject to any disclaimer, the term of this patent is extended or adjusted under 35 U.S.C. 154(b) by 461 days.

(21) Appl. No.: 12/305,665

(22) PCT Filed: Jun. 25, 2007

(86) PCT No.: PCT/SE2007/050464
§ 371 (c)(1), (2), (4) Date: Dec. 19, 2008

(87) PCT Pub. No.: WO2008/002265
PCT Pub. Date: Jan. 3, 2008

(65) Prior Publication Data
US 2010/0229548 A1  Sep. 16, 2010

(30) Foreign Application Priority Data
Jun. 30, 2006 (SE) ...................... 0601446

(51) Int. Cl.
F02M 15/00 (2006.01)
F02M 33/00 (2006.01)

(52) U.S. Cl. .................. 123/542; 123/568.12

(58) Field of Classification Search .......... 123/542, 123/568.12; 60/320
See application file for complete search history.

(56) References Cited

U.S. PATENT DOCUMENTS

| 3,759,054 | A | 9/1973 | Graber |
| 7,536,998 | B2 * | 5/2009 | Held et al. ............ 123/542 |
| 7,886,724 | B2 * | 2/2011 | Tai et al. ............ 123/542 |
| 2006/0236987 | A1 * | 10/2006 | Guerrero ............ 123/542 |
| 2008/0256949 | A1 * | 10/2008 | Wikstrom et al. ....... 60/605.2 |
| 2010/0229842 | A1 * | 9/2010 | Pettersson et al. ...... 123/568.12 |

FOREIGN PATENT DOCUMENTS

| DE | 3522591 A1 | 1/1987 |
| GB | 733188 A | 4/1955 |

OTHER PUBLICATIONS

International Search Report dated Nov. 1, 2007, issued in corresponding international application No. PCT/SE2007/050463.

* cited by examiner

Primary Examiner — M. McMahon
(74) Attorney, Agent, or Firm — Ostrolenk Faber LLP

(57) ABSTRACT

A cooler device for a motor vehicle includes a charge air cooler with a first cooler element, an EGR cooler with a second cooler element, the first and second cooler elements are arranged beside and substantially in plane with one another. The cooler elements each comprise pipelines for the respective medium to be cooled. Air passages for a cooling air flow are arranged between the pipelines. A screening device is arranged in front of or behind the cooler elements to regulate the air flow through elements. A control mechanism switches the screening device to and from between an open position in which the screening device does not, or at least does not appreciably, limit air flow through the air passages of the cooler elements, and a closed position in which the screening device limits the air flow through the air passages between all of the pipelines of the second cooler element and the air flow through the air passages between only some of said pipelines of the first cooler.

6 Claims, 1 Drawing Sheet

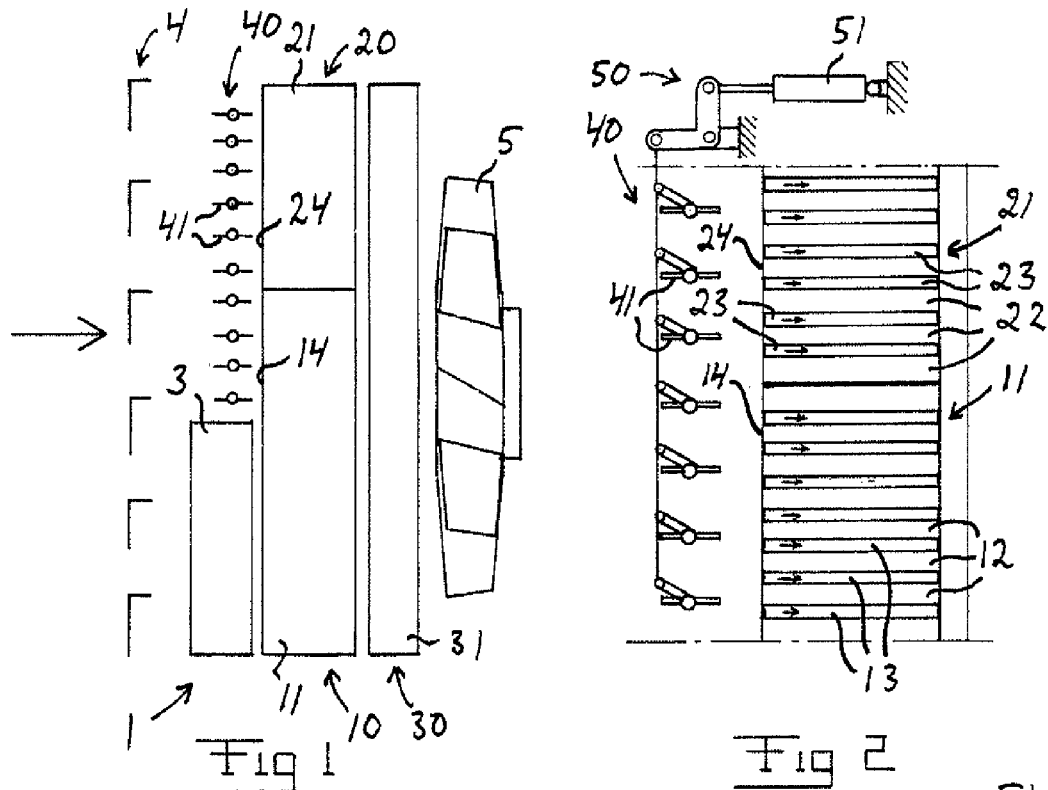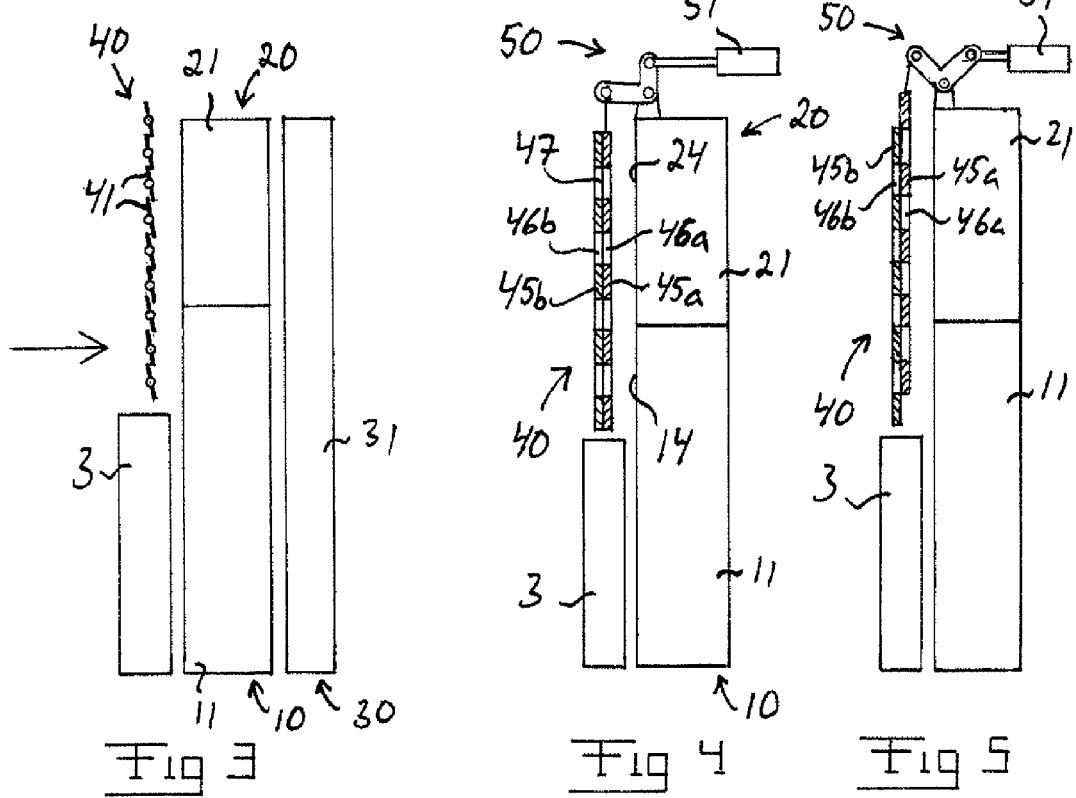

COOLER ARRANGEMENT FOR A MOTOR VEHICLE

CROSS REFERENCE TO RELATED APPLICATION

The present application is a 35 U.S.C. §§371 national phase conversion of PCT/SE2007/050464, filed 25 Jun. 2007, which claims priority of Sweden Application No. 0601446-8, filed 30 Jun. 2006, incorporated by reference herein. The PCT International Application was published in the English language.

FIELD OF THE INVENTION AND STATE OF THE ART

The present invention relates to a cooler device for a motor vehicle comprising a charge air cooler with a first cooler element for cooling of charge air for the motor vehicle's combustion engine and an EGR cooler with a second cooler element for cooling of exhaust gases which are to be led back to said combustion engine, whereby the first cooler element and the second cooler element are arranged beside and substantially in plane with one another, and whereby the respective cooler elements each comprise pipelines for the medium which is to be cooled and air passages for a cooling air flow which are arranged between the pipelines.

A motor vehicle with a supercharged combustion engine and a so-called EGR (exhaust gas recirculation) system for leading exhaust gases back to the combustion engine is often provided with a cooler device comprising a charge air cooler with a substantially platelike cooler element for cooling of charge air for the combustion engine and an EGR cooler with a substantially platelike cooler element for cooling of exhaust gases which are to be led back to the combustion engine. The respective cooler elements each comprise elongate pipelines and cooling flanges connected to the pipelines, whereby the medium which is to be cooled (i.e. charge air or exhaust gases respectively) is led through these pipelines and is cooled, via the cooling flanges, by ambient air which passes through air passages between the pipelines. The cooling flow of ambient air through the air passages is generated by movement of the vehicle and/or by a fan forming part of the cooler device.

A known way of saving space and achieving a cooler device of simple construction in the case of a cooler device of the type indicated above is to assemble the charge air cooler and the EGR cooler to one another with the charge air cooler's cooler element and the EGR cooler's cooler element arranged beside and substantially in plane with one another.

In a motor vehicle with a supercharged combustion engine and air cooling of the charge air, the inlet air for the combustion engine is pressurised by a compressor and the resulting pressurised charge air is thereafter cooled, before being fed into the combustion engine, by a charge air cooler to a temperature a few degrees above the ambient temperature. When the charge air is cooled in the charge air cooler, condensate precipitates in the pipelines of the charge air cooler's cooler element. In cold weather with ambient temperatures below 0° C., there is risk that the precipitated condensate may freeze to ice in the cooler element's pipelines, which may result in undesirable obstruction of the latter. This problem of condensate precipitation and ice formation is usually still greater in an EGR cooler. The risk of ice formation in the cooler elements of the charge air cooler and the EGR cooler can be reduced by limiting the flow of cooling ambient air through the cooler elements.

A known practice is to use various types of screening means, e.g. in the form of louvers, for regulating the air flow through one or more cooler elements of a cooler device in a motor vehicle. These screening means are often arranged immediately in front of or behind one or more cooler elements and are usually maneuverable, either manually or automatically, by a control mechanism to and from between an open position in which the screening means limits only slightly or not at all the air flow through the relating cooler element or elements, and a closed position in which the screening means substantially completely or at least largely limits the air flow through said cooler element or elements. Various types of such screening means are described in, for example, U.S. Pat. No. 4,753,288A, DE 3 701 584 A1 and DE 7 716 940 U1.

OBJECT OF THE INVENTION

The object of the present invention is to provide a further development of a cooler device of the type indicated in the introduction in order to propose a cooler device with a configuration which in at least some respects affords an advantage relative to a conventionally configured cooler device of a relevant type.

SUMMARY OF THE INVENTION

According to the present invention, said object is achieved with a cooler device of the invention.

According to the invention, the cooler device comprises:
- a charge air cooler with a first cooler element for cooling of charge air for the motor vehicle's combustion engine, which cooler element comprises pipelines for the charge air which is to be cooled and air passages for a cooling air flow which are arranged between these pipelines,
- an EGR cooler with a second cooler element for cooling of exhaust gases which are to be led back to said combustion engine, which cooler element comprises pipelines for the exhaust gases which are to be cooled and air passages for a cooling air flow which are arranged between these pipelines, whereby the first cooler element and the second cooler element are arranged beside and substantially in plane with one another,
- a screening means arranged in front of or behind said cooler elements in order to regulate the air flow through them, and
- a control mechanism by which said screening means is switchable to and from between an open position in which the screening means does not, or at least does not appreciably, limit the air flow through said air passages of the cooler elements, and a closed position in which the screening means limits the air flow through the air passages between all of said pipelines of the second cooler element and the air flow through the air passages between only some of said pipelines of the first cooler element in order to counteract ice formation in these pipelines.

The expression "air flow" means here the flow of cooling ambient air which passes through air passages between the pipelines of the cooler elements.

The present invention is based on the insight that for satisfactory functioning of the motor vehicle's combustion engine it is sufficient to prevent ice formation in the EGR cooler's cooler element and in a smaller portion of the charge air cooler's cooler element so that the pipelines of the EGR cooler's cooler element are kept open for exhaust gases to flow through and at least some of the pipelines of the charge air cooler's cooler element are kept open for charge air to flow through in cold weather. Having the screening means screen only part of the charge air cooler's cooler element in its closed position makes it possible to use a screening means which requires relatively little fitting space, with the result that the screening means can for example be placed in the often very cramped space in front of the EGR cooler and the charge air cooler.

Various embodiments of the cooler device according to the invention are described below.

BRIEF DESCRIPTION OF THE DRAWINGS

The invention is described below in more detail on the basis of embodiment examples with reference to the attached drawings, in which:

FIG. 1 depicts a schematic sideview of a cooler device according to a first embodiment of the present invention, showing in an open position a screening means which forms part of the cooler device, FIG. 2 depicts a schematic partly cutaway enlarged detail of part of the cooler device according to FIG. 1, FIG. 3 depicts the cooler device according to FIG. 1, with its screening means in a closed position, FIG. 4 depicts a schematic partly cutaway sideview of a cooler device according to a second embodiment of the present invention, showing in an open position a screening means which forms part of the cooler device, and FIG. 5 depicts the cooler device according to FIG. 4, with its screening means in a closed position.

DETAILED DESCRIPTION OF PREFERRED EMBODIMENTS

FIGS. 1-5 illustrate a cooler device for a motor vehicle according to two different embodiments of the present invention. The cooler device 1 is intended for a motor vehicle which is provided with a supercharged combustion engine and an EGR system. The same or similar parts of the various embodiments in FIGS. 1-5 are given the same reference notations.

The cooler device 1 comprises a charge air cooler 10 of conventional configuration with a substantially platelike cooler element 11 for cooling of charge air for the motor vehicle's combustion engine, i.e. inlet air to the combustion engine which is compressed in a compressor in the motor vehicle before it is supplied to the combustion engine. The charge air cooler 10 is intended to receive via an undepicted pipeline warm charge air from a compressor of the motor vehicle and to be connected via an undepicted pipeline to the motor vehicle's combustion engine in order to feed charge air to the latter. The cooler element 11 comprises elongate pipelines 12 extending at a distance from one another to which cooling flanges (not depicted) are connected. FIG. 2 depicts the pipelines 12 in cross-section and they here take the form of flat tubes of rectangular cross-sectional shape. Air passages 13 are arranged between the cooler element's pipelines 12 to allow cooling ambient air to pass through the cooler element in the direction indicated by the arrows in FIG. 2. Charge air from said compressor is led through the cooler element's pipelines 12 and is cooled, via the cooling flanges, by ambient air which passes through the air passages 13 between the pipelines.

The cooler device 1 also comprises an EGR cooler 20 of conventional configuration with a substantially platelike cooler element 21 for cooling of exhaust gases which are diverted from the motor vehicle's exhaust line in order to be led back to the motor vehicle's combustion engine. The EGR cooler 20 is adapted to cooling these exhaust gases before they are led back to the combustion engine and is intended to receive via an undepicted pipeline warm exhaust gases from the motor vehicle's exhaust line and to be connected via an undepicted pipeline to the inlet air duct of the motor vehicle's combustion engine in order to feed exhaust gases to the latter. The cooler element 21 comprises elongate pipelines 22 extending at a distance from one another to which cooling flanges (not depicted) are connected. FIG. 2 depicts the pipelines 22 in cross-section and they take the form of flat tubes of rectangular cross-sectional shape. Air passages 23 are arranged between the cooler element's pipelines 22 to allow cooling ambient air to pass through the cooler element in the direction indicated by the arrows in FIG. 2. Exhaust gases from the motor vehicle's exhaust line are led through the cooler element's pipelines 22 and are cooled, via the cooling flanges, by ambient air which passes through the air passages 23 between the pipelines.

The EGR cooler's cooler element 21 and the charge air cooler's cooler element 11 are arranged beside and substantially in plane with one another. In the embodiments illustrated, the EGR cooler 20 is arranged above the charge air cooler 10.

In the examples illustrated, a radiator liquid cooler 30 of conventional configuration with a substantially platelike cooler element 31 for cooling of radiator liquid for the motor vehicle's combustion engine is arranged behind the charge air cooler 10 and the EGR cooler 20 as seen in the motor vehicle's intended direction of movement. In addition, a vehicle component 3, which may for example take the form of a condenser for the motor vehicle's air conditioning system or an oil cooler, is arranged in front of the charge air cooler 10 as seen in the motor vehicle's intended direction of movement. FIG. 1 also shows a grille 4 arranged at the front of the motor vehicle.

The cooling flow of ambient air through the air passages 13, 23 of the respective cooler elements 11, 21, 31 is generated by forward movement of the motor vehicle and/or by a fan 5. In the example illustrated in FIG. 1, this fan 5 is arranged behind the radiator liquid cooler 30 as seen in the motor vehicle's intended direction of movement.

According to the invention, the cooler device 1 comprises:
a screening means 40 arranged in front of or behind the charge air cooler's and the EGR cooler's cooler elements 11, 21 to regulate the air flow through the latter, and
a control mechanism 50 by which said screening means 40 is switchable to and from between an open position in which the screening means 40 does not, or at least does not appreciably, limit the air flow through said air passages 13, 23 of the charge air cooler's and the EGR cooler's cooler elements 11, 21, and a closed position in which the screening means 40 substantially completely, or at least to a larger extent than in the open position, limits the air flow through the air passages 23 between all of the aforesaid pipelines 22 of the EGR cooler's cooler element 21 and the air flow through the air passages 13 between only some of the aforesaid pipelines 12 of the charge air cooler's cooler element 11 in order to counteract ice formation in these pipelines 12, 22.

In the embodiments illustrated, the screening means 40 is arranged immediately in front of the EGR cooler 20 and the upper portion of the charge air cooler 10 as seen in the motor vehicle's intended direction of movement, i.e. between these coolers 10, 20 and the grille 4, but it might alternatively be arranged immediately behind these coolers 10, 20, i.e. between these coolers 10, 20 and the radiator liquid cooler 30.

The control mechanism 50 may with advantage comprise a pneumatic or hydraulic cylinder 51 for switching the screening means 40, as illustrated in FIGS. 2, 4 and 5.

In the embodiment illustrated in FIGS. 1-3, the screening means 40 takes the form of a louver comprising blades 41 which are pivotable by the control mechanism 50 to and from between an open position (see FIGS. 1 and 2) where the blades 41 extend substantially perpendicular to the adjacent sideplanes 14, 24 of the cooler elements 11, 21 and a closed position (see FIG. 3) where the blades 41 extend substantially parallel with the adjacent sideplanes 14, 24 of the cooler elements 11, 21. The blades 41 are with advantage arranged to overlap one another in the closed position, as illustrated in FIG. 3.

In the embodiment illustrated in FIGS. 4 and 5, the screening means 40 comprises two disc-like screening elements 45*a*, 45*b* which face one another and have apertures 46*a*, 46*b* through them. One screening element 45*a* is movable in its plane of extent relative to the other screening element 45*b* by the control mechanism 50 in such a way that the apertures 46*a*, 46*b* in the screening elements cooperate to form air passages 47 which extend through the screening means 40 and which are larger when the screening means is in the open position (see FIG. 4) than when the screening means is in the closed position (see FIG. 5). Said apertures 46*a*, 46*b* may for example take the form of elongate gaps. Said air passages 47 are with advantage totally closed when the screening means 40 is in the closed position, as illustrated in FIG. 5.

The screening means 40 might also be of some other configuration than that illustrated in the attached drawings and might for example comprise a screening fabric which is movable by a control mechanism into and out of the space in front of the EGR 20 and the relevant portion of the charge air cooler 10.

The screening means 40 may be so arranged that in the closed position it limits the air flow through the air passages 13 between fewer than half of the aforesaid pipelines 12 of the charge air cooler's cooler element 11. In the embodiments illustrated, the screening means 40 is so arranged that in the closed position it masks substantially the whole of the side surface 24 of the EGR cooler's cooler element 21 which faces towards the screening means, but less than half of the side surface 14 of the charge air cooler's cooler element 11 which faces towards the screening means.

The screening means 40 may for example be fastened to the EGR cooler 20 and the charge air cooler 10 or to the grille 4.

The invention is of course in no way limited to the embodiments described above, since many possibilities for modifications thereof are likely to be obvious to a specialist in the field without thereby departing from the fundamental concept of the invention as defined in the attached claims.

The invention claimed is:

1. A cooler device for a motor vehicle comprising
a charge air cooler with a first cooler element operable for cooling of charge air for a combustion engine of the motor vehicle;
an EGR cooler with a second cooler element operable for cooling of exhaust gases which are to be led back to a combustion engine;
the first cooler element and the second cooler element are arranged beside and substantially in a plane with one another, the first and the second cooler elements each comprise pipelines for the charge air and the exhaust gases respectively which are to be cooled, and comprise air passages for a cooling air flow and which are arranged between the pipelines;
a screening device arranged in front of or behind the cooler elements in a direction of air flow past the cooler device in order to regulate the air flow through the first and the second cooler elements;
a control mechanism operable to switch the screening device to and from between an open position in which the screening device does not, or at least does not appreciably, limit the air flow through the air passages of the cooler elements, and a closed position in which the screening device limits the air flow through the air passages between all of the pipelines of the second cooler element and limits the air flow through the air passages between fewer than all of the pipelines of the first cooler element.

2. A cooler device according to claim 1, wherein the screening device is so arranged that in the closed position it limits the air flow through the air passages between fewer than half of the pipelines of the first cooler element.

3. A cooler device according to claim 2, wherein the screening device is so arranged that in the closed position, it masks substantially an entire side surface of the second cooler element which faces towards the screening device and less than half of a side surface of the first cooler element which faces towards the screening device.

4. A cooler device according to claim 1, wherein the screening device comprises blades which are pivotable between the open and closed positions by the control mechanism.

5. A cooler device according to claim 1, wherein the screening device comprises at least two disc-shaped screening elements which face towards one another and which each have apertures through them, at least one of the screening elements is movable in its plane of extent relative to the other screening element by the control mechanism, the apertures in the screening elements are arranged to cooperate to form air passages which extend through the screening device and which are larger when the screening device is in the open position than when the screening device is in the closed position.

6. A cooler device for a motor vehicle comprising
a charge air cooler with a first cooler element operable for cooling of charge air for the combustion engine of a motor vehicle;
an EGR cooler with a second cooler element operable for cooling of exhaust gases which are to be led back to a combustion engine,
the first and the second cooler elements each comprise pipelines for the charge air and the exhaust gases respectively which are to be cooled, and comprise air passages for a cooling air flow and which are arranged between the pipelines;
a screening device arranged in front of or behind the cooler elements in a direction of air flow past the cooler device in order to regulate the air flow through the first and the second cooler elements;
a control mechanism operable to switch the screening device to and from between an open position in which the screening device does not, or at least does not appreciably, limit the air flow through the air passages of the cooler elements, and a closed position in which the screening device limits the air flow through the air passages between all of the pipelines of the second cooler element and limits the air flow through the air passages between fewer than all of the pipelines of the first cooler element.

* * * * *